(12) United States Patent
Liu et al.

(10) Patent No.: US 10,921,794 B2
(45) Date of Patent: Feb. 16, 2021

(54) PARALLEL CONTROL METHOD BASED ON MULTI-PERIOD DIFFERENTIAL SAMPLING AND DIGITAL TWINNING TECHNOLOGIES

(71) Applicant: GUANGDONG UNIVERSITY OF TECHNOLOGY, Guangdong (CN)

(72) Inventors: Qiang Liu, Guangzhou Guangdong (CN); Yuan Song, Guangzhou Guangdong (CN); Jiewu Leng, Guangzhou Guangdong (CN); Guixiang Lin, Guangzhou Guangdong (CN); Hao Zhang, Guangzhou Guangdong (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 16/826,205

(22) Filed: Mar. 21, 2020

(65) Prior Publication Data
US 2020/0326692 A1  Oct. 15, 2020

Related U.S. Application Data

(63) Continuation of application No. PCT/CN2020/079739, filed on Mar. 17, 2020.

(30) Foreign Application Priority Data

Apr. 10, 2019 (CN) .......................... 201910285327.0

(51) Int. Cl.
*G06G 7/48* (2006.01)
*G05B 19/418* (2006.01)
(Continued)

(52) U.S. Cl.
CPC ....... *G05B 19/41885* (2013.01); *G05B 17/02* (2013.01); *G05B 19/052* (2013.01);
(Continued)

(58) Field of Classification Search
CPC .. G06F 17/5004; G06F 30/20; G06F 17/5009; G06F 17/5086; G01M 5/00;
(Continued)

(56) References Cited

U.S. PATENT DOCUMENTS

2003/0165884 A1* 9/2003 Chow .................. C12Q 1/6881
                                                          435/6.11
2009/0153583 A1  6/2009 Anai
(Continued)

FOREIGN PATENT DOCUMENTS

| CN | 107861478 A | 3/2018 |
| CN | 108919760 A | 11/2018 |
| CN | 109571476 A | 4/2019 |

OTHER PUBLICATIONS

<<Computers & Industrial Engineerind>> Dec. 31, 2018 Margherita Peruzzini Exploring the potential of Operator 4.0 interface and monitoring 1-10 p. 1-p. 19.
(Continued)

*Primary Examiner* — Rehana Perveen
*Assistant Examiner* — Nithya J. Moll

(57) ABSTRACT

The present invention relates to the field of intelligent machining, in particular to a parallel control method based on multi-period differential sampling and digital twinning technologies, the method comprising the following steps of: a. detecting machining conditions of dotting machine equipment by using a multi-period differential sampling technology; b. establishing a digital twinning control model; and c. controlling a simulation model of the dotting machine equipment according to a detection judgment result so as to perform parallel control on the dotting machine equipment. According to the parallel control method based on multi-period differential sampling and digital twinning modelling provided by the present invention, for the digital twinning model of the dotting machine equipment, the parallel control
(Continued)

method establishes a simulation model and a detection model of the dotting machine equipment by using a virtual-real synchronization technology; simulation dotting machine equipment operates in synchronization with the physical dotting machine equipment.

5 Claims, 3 Drawing Sheets

(51) Int. Cl.
 *G05B 19/05* (2006.01)
 *G05B 17/02* (2006.01)
 *G06T 5/00* (2006.01)
 *G06F 30/20* (2020.01)
(52) U.S. Cl.
 CPC .............. *G06F 30/20* (2020.01); *G06T 5/002* (2013.01); *G05B 2219/13174* (2013.01); *G05B 2219/24055* (2013.01); *G05B 2219/24097* (2013.01)

(58) Field of Classification Search
 CPC ...... Y02B 10/30; G05B 17/02; G05B 19/052; G05B 19/41885; G05B 2219/13174; G05B 2219/24055; G05B 2219/24097; G05B 19/054; G06T 5/002; G01D 21/02
 See application file for complete search history.

(56) References Cited

U.S. PATENT DOCUMENTS

2018/0305266 A1* 10/2018 Gibson ................. B22F 7/06
2019/0086602 A1* 3/2019 Gong ................. G02B 6/0043
2020/0012265 A1* 1/2020 Thomsen ............. G06F 3/0482

OTHER PUBLICATIONS

<<Computer Measurement and Control>> vol. 26 No. 10 Dec. 31, 2018 Wang Ling Research on docking technology of aeroengine low-pressure turbine unit body based on digital twin 1-10 pp. 286-290, 303.

* cited by examiner

PARALLEL CONTROL METHOD BASED ON MULTI-PERIOD DIFFERENTIAL SAMPLING AND DIGITAL TWINNING TECHNOLOGIES

CROSS-REFERENCE TO RELATED APPLICATIONS

This application is a continuation of International Patent Application No. PCT/CN2020/079739, filed on Mar. 17, 2020, which claims the benefit of priority from Chinese Patent Application No. 201910285327.0, filed on Apr. 10, 2019. The contents of the aforementioned application, including any intervening amendments thereto, are incorporated herein by reference in its entirety.

TECHNICAL FIELD

The present invention relates to the field of intelligent machining, in particular to a parallel control method based on multi-period differential sampling and digital twinning technologies.

BACKGROUND

With the development of the mobile phone industry, the competition in the mobile phone production industry is increasingly fierce, and how to improve production efficiency and quality has become one of the main research and development directions for manufacturers to improve their competitiveness. A backlight module of a smart phone is mainly composed of an LED, a light guide plate, a reflector, a diffuser and a brightness enhancement film (BEF), where light is emitted by the LED and reshaped by the structures of various layers in the backlight module such that a content can be displayed on a screen of the mobile phone. The light guide plate is mainly used for guiding the direction of light so as to enhance the brightness of the panel and determine the uniformity of light, thereby being a critical component that determines the thickness and optical brightness uniformity of the backlight module. The machining of light guide plates is realized by means of light guide plate mold copying, and the mold core of a light guide plate mold is machined by a dotting machine performing high-speed dotting motions, so that the machining precision of a microstructure array of the light guide plate mold determines the quality of light guide plates. There are millions of microstructure dense array dots on one smart phone light guide plate, and in order to enable the light guide plate to emit light uniformly, the machining quality and dimensional precision of the microstructure array dots must be guaranteed. The machining of the microstructure array of the mold core of the light guide plate is not only related to the precision machining process, but also closely related to high-precision detection technologies.

In the prior art, when dotting machine equipment is used for machining a microstructure array on a raw material, it is required to artificially observe machining conditions in real time, and then artificially regulate and control machining operations and parameters of the dotting machine equipment to ensure the machining to be performed smoothly. Therefore, the dotting machine equipment always needs an operator to stay in its vicinity, and operations of the dotting machine equipment are completely manipulated by the operator in the vicinity of the dotting machine equipment, so that remote parallel control cannot be used. For the above reasons, in the prior art, each dotting machine must be allocated with one corresponding operator, and the operator cannot perform rapid parallel control on multiple pieces of dotting machine equipment, so that in the prior art, when dotting machine equipment is used for machining microstructure arrays on raw materials, the operations are complex, and the problem of frequent shutting-down may even occur, which excessively prolongs the machining period; the high investment of labor work causes high cost of the machining; parallel control cannot be used, so that the machining quality of products cannot be guaranteed; and the operator must always stay in a machining workshop, and due to the high-speed motions of the dotting machine equipment, it is dangerous for the operator to manipulate the dotting machine equipment in real time on site, and the safety of the operator cannot be ensured.

SUMMARY

In order to solve the above defects, an object of the present invention is to provide a parallel control method based on multi-period differential sampling and digital twinning technologies, by which remote parallel control on dotting machine equipment is enabled such that an operator may control the dotting machine equipment with improved convenience and accuracy, and the quality of products and the safety of the operator are both ensured.

In order to achieve the purpose, the present invention adopts the following technical scheme: a parallel control method based on multi-period differential sampling and digital twinning technologies, which is applicable to a machining process of dotting machine equipment, includes the following steps of:

a. detection: a1. clamping a machining raw material for making a mold onto dotting machine equipment, and configuring a photographing device according to photographing requirements; a2. starting the dotting machine equipment and the photographing device, and photographing, by the photographing device, the machining raw material in each of a plurality of machining periods to obtain a plurality of periodic samples; a3. integrating, by an integration processing module, the plurality of periodic samples into a sample image of one period by using a differential sampling technology over oscillation periods to establish a detection model; and a4. processing, by an image processing module, the sample image to obtain a detection image;

b. control model establishment: b1. carrying out simulation modeling for the dotting machine equipment by designing a simulation model of the dotting machine equipment to obtain a dotting machine model; b2. carrying out dynamic implementation of the dotting machine equipment by setting machining parameters for the dotting machine model according to a preset design, implementing actions of single machine equipment, implementing work-in-process logistics and motions, programming motion and action control scripts, and executing an off-line simulation run; b3. integrating the dotting machine model with the dotting machine equipment by using a virtual-real synchronization technology with a simulation platform to achieve motion synchronization of the dotting machine model and the dotting machine equipment; and b4. carrying out system integration design by building a virtual control network, i.e. implementing an internet-of-things in a workshop, and building a virtual-real synchronized physical entity simulation platform by using a digital twinning technology to achieve motion synchronization of a single machine physical entity with a single machine digital model; and integrating an upper MES system with a digital twinning model such that the digital twinning model operates under instructions generated by the MES, and execution conditions of the digital twinning model are fed back to the MES, achieving online monitoring and simulation running of the dotting machine equipment; and c. parallel control: controlling the dotting machine model according to the detected image to perform parallel control on the dotting machine equipment.

Preferably, in the step a, the integrating into the sample image of one period by the differential sampling technology over oscillation periods includes the following specific steps of: representing a machining period of same machining units in a machining path as T (ms), and setting a sampling period of an industrial camera as $$nT + \frac{T}{m} \text{ (ms)};$$

wherein n represents a responding speed of the industrial camera to the machining period, and m is a digit for evenly dividing one period of the machining unit according to precision requirements of digital twinning synchronization; and n is an integer obtained by rounding up a ratio of a camera time to the machining period.

Preferably, m is set according to the precision requirements of digital twinning synchronization and used for dividing one machining period to determine that the state and machining quality of the machining equipment in one machining period is indirectly characterized by images of m time points, i.e. image data acquisition is carried out in a plurality of similar periods, in which an image is acquired at one time point in each period, such as an image is acquired at a first time point in a first period, an image is acquired at a second time point in a second period and so on, an image is acquired at an mth time point in a last period, and finally, m real-time states acquired in one machining process are combined according to a time sequence into a sampling state of one period. Preferably, in the step a4, the step of processing the sample image includes: converting the sample image into a gray-scale image, and then processing the gray-scale image by noise reduction and contrast adjustment.

Preferably, the method further includes a judgment step b5 after the step b4, and the step b5 includes: identifying and analyzing, by a detection identifying module, the detection image to obtain detection data, and comparing, by a judging device, the detection data with machining setting data; when the detection data exceeds a threshold value set by the machining setting data, determining a judgment result as unqualified, and controlling, by an operator, the dotting machine model according to the judgment result to perform parallel control on the dotting machine equipment; and when the detection data does not exceed the threshold value set by the machining setting data, determining the judgment result as qualified, and stopping in-site detection operation without the operator controlling the dotting machine model for any operation.

Preferably, in the step b1, the designing the simulation model of the dotting machine equipment includes the following specific steps of: firstly, designing the simulation model with a mechanical three-dimensional modeling platform, then inputting an obtained design of the simulation model into a simulation platform for secondary processing of the model, modifying equipment size and layout in the simulation model, and distinguishing movable components and fixed components. Preferably, in the step b2, the executing the off-line simulation run includes the following specific operations of: implementing process actions of the dotting machine with Jscript language by utilizing a secondary development function provided by the simulation platform, and performing punching tests with off-line simulation of machining parameters on the platform; and in the step b, the machining parameters set for the dotting machine model include: voltage, speed and pressure. Specifically, the simulation platform is a Demo3D simulation platform.

Preferably, in the step b3, the virtual-real synchronization technology includes: firstly, ensuring consistency of design parameters of the dotting machine model and the dotting machine equipment; taking the dotting machine model as a driving model, and taking the dotting machine equipment as a driven part; and connecting both the dotting machine model and the dotting machine equipment to a same PLC control system to achieve synchronization of signals of the dotting machine model and the dotting machine equipment; in the step b3, the dotting machine model and the dotting machine equipment are both connected to the same PLC control system in a manner that: binding an I/O point in the Demo3D with an address of an I/O point in the PLC, and the I/O point in the PLC control system controls motion parameters of a physical entity; and the dotting machine model mainly works with a workpiece triggering a sensor and the I/O point and internal logic of the PLC control system driving the dotting machine equipment to perform motions synchronously.

Preferably, the design parameters include: size, layout and control logic of the dotting machine model; the motion parameters include: moving direction, moving speed, stroke, starting and stopping of the dotting machine equipment; and the execution conditions of the digital twinning model include: work order completion information and random failures.

According to the parallel control method based on multi-period differential sampling and digital twinning modelling provided by the present invention, for the digital twinning model of the dotting machine equipment, the parallel control method establishes a simulation model and a detection model of the dotting machine equipment by using a virtual-real synchronization technology; simulation dotting machine equipment operates in synchronization with the physical dotting machine equipment, so that real-time detection and corresponding precise parallel control in a dotting process of the dotting machine equipment are achieved; and an operator can remotely control the dotting machine equipment, and is enabled to perform one-to-many fast control, so that the convenience and accuracy of control operations are improved.

DETAILED DESCRIPTION OF EMBODIMENTS

The technical schemes of the present invention will be further explained by means of specific embodiments with reference to the accompanying drawings.

Digital twinning a simulation process fully utilizing data such as physical models, sensor updating, operation history, and integrating multiple disciplines, multiple physical quantities, multiple scales and multiple probabilities. Digital twinning performs mapping in a virtual space to reflect a whole life cycle process of corresponding entity equipment, therefore also referred to as "digital mirroring", "digital twins" or "digital mapping".

A digital twinning model mainly relates to a simulation model and physical equipment, and interfacing therebetween is the key to realize the digital twinning model. The interfacing of low-speed machining equipment model usually adopts binding of PLC points in the Ethernet, and data is transmitted by a cloud router to drive the simulation model and the physical equipment to perform motions cooperatively. For high-speed point-to-point motion equipment, the state of the physical motion equipment is sampled in real time by using a multi-period differential sampling technology, and the state and machining quality of the machining equipment are indirectly characterized by machining equipment locations and machining precision data obtained by uniformly arranging sampling points in multiple periods, that is, the working states of the physical equipment is mapped to the virtual simulation model in real time, and the performance of the high-speed point-to-point motion equipment can be analyzed by a virtual model and fed back to a physical system. As such, a digital twinning model for the high-speed point-to-point motion equipment is established. On the basis of such digital twinning model, rapid customization, high-fidelity hardware-in-the-loop simulation and transparent monitoring of a production line can be carried out, and in-site information can be fed back to the model and system in real time, thereby achieving full-view cross-granularity real-time monitoring on the whole line working in synchronization with the digital twinning model. Accordingly, intelligent operation and maintenance is performed, feeding and production processes are simulated, process data is acquired, statistics and analysis are performed on equipment utilization, production balance, bottleneck procedures in a manufacturing process, and the manufacturing period and cost are predicted.

Figure 1:
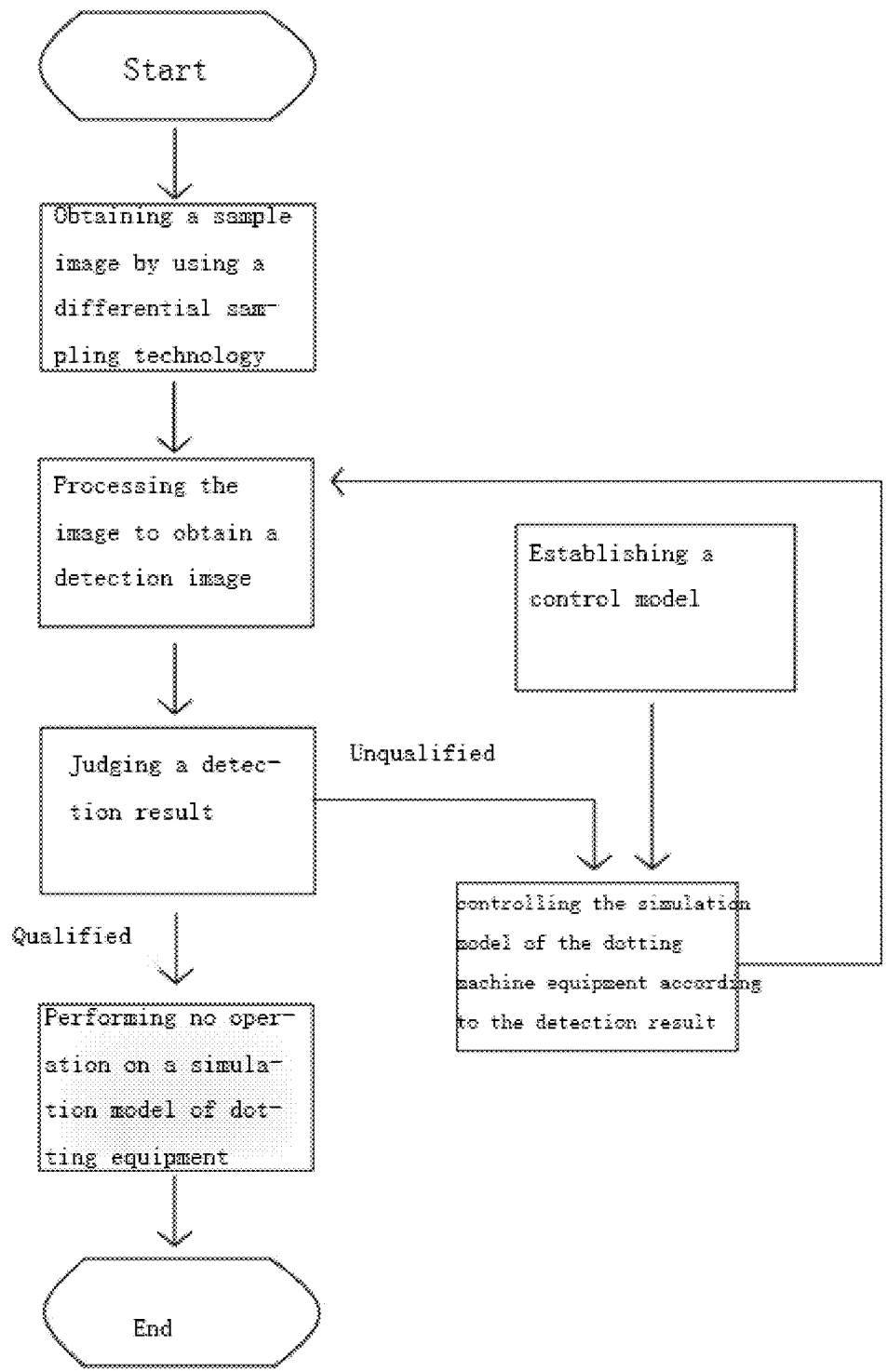
FIG. 1 is a flow chart illustrating a monitoring method based on multi-period differential sampling and digital twinning model techniques according to an embodiment of the present invention.
Figure 2:
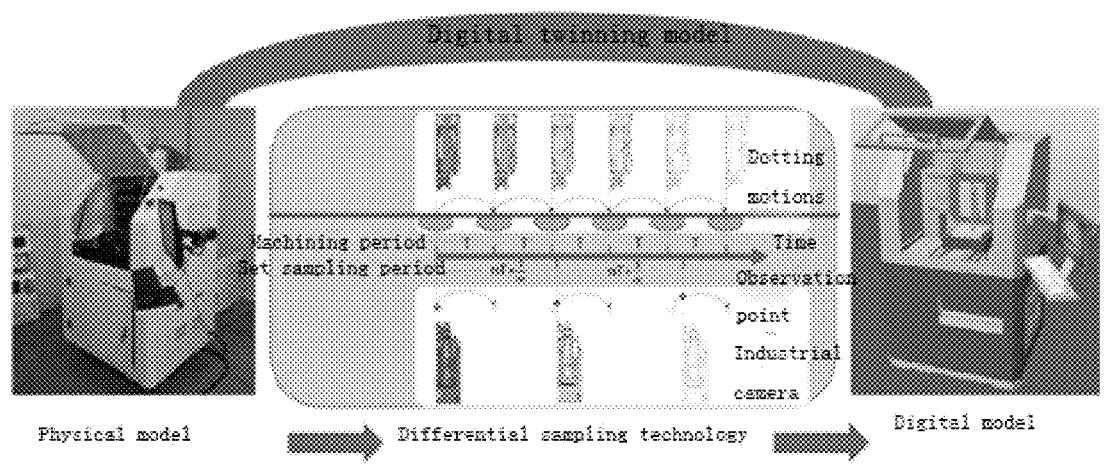
FIG. 2 is a schematic view illustrating establishment of a detection model for detecting dotting machining results in a dotting process of a dotting machine according to an embodiment of the present invention.
Figure 3:
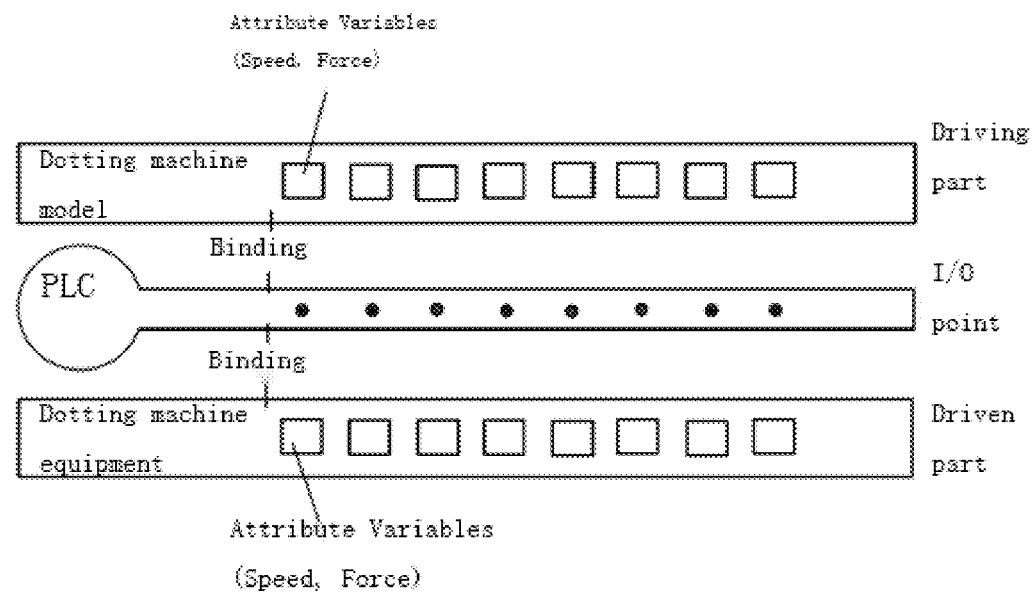
FIG. 3 is a schematic diagram illustrating associated synchronization among a dotting machine model, a PLC control system and dotting machine equipment according to an embodiment of the invention.
Figure 4:
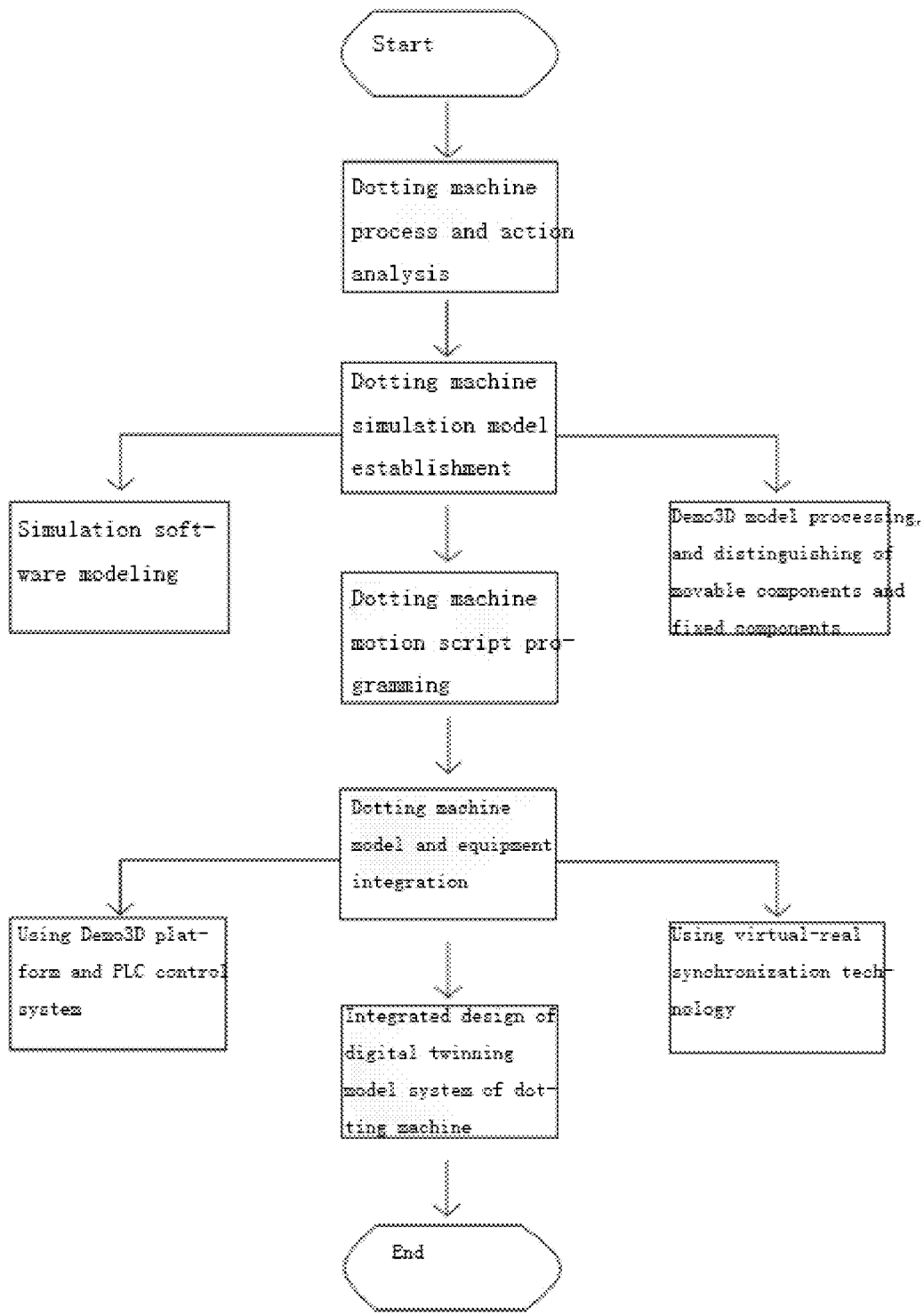
FIG. 4 is a flow chart illustrating a step of control model establishment according to an embodiment of the invention.

As shown in FIGS. 1 to 4, a parallel control method based on multi-period differential sampling and digital twinning technologies, which is applicable to a machining process of dotting machine equipment, includes the following steps that:

a. detection: a1. a machining raw material for making a mold is clamped onto dotting machine equipment, and a photographing device is configured according to photographing requirements; a2. the dotting machine equipment and the photographing device are started, and the machining raw material is photographed by the photographing device in each of a plurality of machining periods to obtain a plurality of periodic samples; a3. the plurality of periodic samples are integrated by an integration processing module into a sample image of one period by using a differential sampling technology over oscillation periods to establish a detection model; and a4. the sample image is processed by an image processing module to obtain a detection image;

b. control model establishment: b1. simulation modeling for the dotting machine equipment are performed by designing a simulation model of the dotting machine equipment to obtain a dotting machine model; b2, dynamic implementation of the dotting machine equipment is carried out by setting machining parameters for the dotting machine model according to a preset design, implementing actions of single machine equipment, implementing work-in-process logistics and motions, programming motion and action control scripts, and executing an off-line simulation run; b3, the dotting machine model is integrated with the dotting machine equipment by using a virtual-real synchronization technology with a simulation platform to achieve motion synchronization of the dotting machine model and the dotting machine equipment; and b4, system integration design is carried out by building a virtual control network, i.e. implementing an internet-of-things in a workshop, and a virtual-real synchronized physical entity simulation platform is built by using a digital twinning technology to achieve motion synchronization of a single machine physical entity with a single machine digital model; and an upper MES system is integrated with a digital twinning model such that the digital twinning model operates under instructions generated by the MES, and execution conditions of the digital twinning model are fed back to the MES, achieving online monitoring and simulation running of the dotting machine equipment; and c. parallel control: the dotting machine model is controlled according to the detected image to perform parallel control on the dotting machine equipment.

Preferably, in the step a, the integrating into the sample image of one period by the differential sampling technology over oscillation periods includes the following specific steps that: a machining period of same machining units in a machining path is represented as T (ms), and a sampling period of an industrial camera is set as $$nT + \frac{T}{m} \text{ (ms)};$$

wherein n represents a responding speed of the industrial camera to the machining period, and m is a digit for evenly dividing one period of the machining unit according to precision requirements of digital twinning synchronization; and n is an integer obtained by rounding up a ratio of a camera time to the machining period.

Preferably, m is set according to the precision requirements of digital twinning synchronization and used for dividing one machining period to determine that the state and machining quality of the machining equipment in one machining period is indirectly characterized by images of m time points, i.e. image data acquisition is carried out in a plurality of similar periods, in which an image is acquired at one time point in each period, such as an image is acquired at a first time point in a first period, an image is acquired at a second time point in a second period and so on, an image is acquired at an mth time point in a last period, and finally, m real-time states acquired in one machining process are combined according to a time sequence into a sampling state of one period.

Preferably, in the step a4, the step of processing the sample image includes: the sample image is converted into a gray-scale image, and then the gray-scale image is processed by noise reduction and contrast adjustment.

Preferably, the method further includes a judgment step b5 after the step b4, and the step b5 includes: the detection image is identified and analyzed by a detection identifying module to obtain detection data, and the detection data is compared with machining setting data by a judging device; when the detection data exceeds a threshold value set by the machining setting data, a judgment result is determined as unqualified, and the dotting machine model is controlled by an operator according to the judgment result to perform parallel control on the dotting machine equipment; and when the detection data does not exceed the threshold value set by the machining setting data, the judgment result is determined as qualified, and in-site detection operation is stopped without the operator controlling the dotting machine model for any operation.

Preferably, in the step b1, the designing the simulation model of the dotting machine equipment includes the following specific steps that: firstly, the simulation model is designed with a mechanical three-dimensional modeling platform, then an obtained design of the simulation model is input into a simulation platform for secondary processing of the model, equipment size and layout in the simulation model are modified, and movable components and fixed components distinguished.

Preferably, in the step b2, the executing the off-line simulation run includes the following specific operations that: process actions of the dotting machine are implemented with Jscript language by utilizing a secondary development function provided by the simulation platform, and punching tests are carried out with off-line simulation of machining parameters on the platform; and in the step b, the machining parameters set for the dotting machine model include: voltage, speed and pressure.

Specifically, the simulation platform is a Demo3D simulation platform.

Preferably, in the step b3, the virtual-real synchronization technology includes: firstly, consistency of design parameters of the dotting machine model and the dotting machine equipment is ensured; the dotting machine model is taken as a driving model, and the dotting machine equipment is taken as a driven part; and both the dotting machine model and the dotting machine equipment are connected to a same PLC control system to achieve synchronization of signals of the dotting machine model and the dotting machine equipment; in the step b3, the dotting machine model and the dotting machine equipment are both connected to the same PLC control system in a manner that: an I/O point in the Demo3D is bound with an address of an I/O point in the PLC, and the I/O point in the PLC control system controls motion parameters of a physical entity; and the dotting machine model mainly works with a workpiece triggering a sensor and the I/O point and internal logic of the PLC control system driving the dotting machine equipment to perform motions synchronously.

Preferably, the design parameters include: size, layout and control logic of the dotting machine model; the motion parameters include: moving direction, moving speed, stroke, starting and stopping of the dotting machine equipment; and the execution conditions of the digital twinning model include: work order completion information and random failures.

Dotting machine equipment, to which the above parallel control method based on the multi-period differential sampling and digital twinning technologies is applied, includes: a dotting machine, a photographing device, an integration processing module, an image processing module, a mechanical three-dimensional modeling platform, a Demo3D simulation platform, a PLC control system and an SCADA system;

the dotting machine is used for dotting and further machining a machining raw material to obtain a light guide plate; the photographing device, specifically, an industrial camera, is used for photographing the machining raw material in each of a plurality of machining periods to obtain a plurality of periodic samples; the integration processing module is used for integrating the plurality of periodic samples into a sample image of one period by using a differential sampling technology over oscillation periods; the image processing module is used for processing the sample image to obtain a detection image; the mechanical three-dimensional modeling platform is used for establishing a design of a simulation model according to overall mechanical parameters of the dotting machine equipment; the Demo3D simulation platform is used for optimizing the design of the simulation model and coupling to the PLC control system; the PLC control system is used for enabling motion synchronization of the dotting machine model and the dotting machine equipment, and controlling motions of the dotting machine model and the dotting machine equipment; and the SCADA system is capable of acquiring machining conditions of the dotting machine model or the dotting machine equipment in real time so as to achieve the purpose of real-time detection of the machining state of the dotting machine equipment.

In the parallel command control method, the differential sampling technology is used, and with the proposed digital twinning model, logic verification and control are directly carried out in the digital model of the dotting machine equipment, so that fault reasons are quickly located, and whether the system meets quality control requirements or not is checked actively. Therefore, with the implementation of digital twinning, the positioning precision of an initial dotting machine tool is improved from 4.0 m to 2.0 m. The dotting speed is increased from 20-25 dots per second to 20-65 dots per second, which is also superior to 20-40 dots per second of a mainstream machine tool. The experimental results of machining meet the actual requirements, indicating that the developed digital twinning system is suitable for micro-point machining of ultra-precision machine tools. A traditional compensation strategy of a dot detecting system is to directly determine a displacement output of piezoelectric ceramics based a simulation input. However, in process compensation of the proposed digital twinning, the nonlinearity of piezoelectric ceramics is compensated by an on-line optimized input value of piezoelectric ceramics, so that the use of the digital twinning model is helpful to make more intelligent control decisions for the dotting machine. The digital twinning system platform can optimize a dynamic execution mechanism. The performance of the whole dotting machine can be virtually analyzed and fed back to the physical system. Once the performance is insufficient, the operations can be adjusted and iterated until the best state is achieved. An equipment-level context-aware scheme is formed, and all control decisions of the machine are evaluated and made by using a context analysis method, supporting on-line optimization of performance indexes. The proposed dotting machine model is relatively flexible, and each dotting machine can be configured on-line to have different customized machining parameters and quality requirements, so that a large amount of option variants is provided to meet customization requirements.

The parallel control method is applied to the dotting machine equipment in a manner that: a monitoring method based on a digital twinning model executes a simulation run in a light guide plate machining process: the simulation run may be executed on the basis of the step a and the step b. Machining parameters, such as voltage value, speed and force of the dotting machine are set in simulation on the Demo3D platform, and the voltage value of the dotting machine is repeatedly adjusted with observation of the punching quality of the light guide plate so as to find an appropriate voltage value.

The monitoring method based on the digital twinning model provides monitoring and synchronous testing as well as synchronous optimization in the machining process of the light guide plate: by establishing the digital twinning model of the dotting machine, instruction, action and information synchronization of the dotting machine equipment and the dotting machine model can be achieved. With the feedback of the digital twinning model acquired by the SCADA system, the operation state and information of the dotting machine equipment can be monitored, such as operating voltage, punching speed and other parameters of the dotting machine. If the quality of the machined dots of the light guide plate is not qualified, the voltage value of the dotting machine can be timely adjusted, so that the machining quality is guaranteed, and the effect of synchronous testing and optimization of in the machining process of the dotting machine is achieved.

According to the invention, with adoption of the multi-period differential sampling and digital twinning technologies, a detection model and a simulation model are established; and the simulation model integrates real-time parallel control of synchronous operation, synchronous testing and synchronous optimization of physical entities and simulation, and the detection model is used for detecting the machining conditions of the dotting machine in real time. By means of the virtual-real synchronization technology, the synchronous operation of the physical entity dotting machine equipment and the simulation dotting machine equipment is achieved, the operation information and the state of the equipment can be tracked and displayed in a three-dimensional visual mode, meanwhile, real-time instruction data and statistical data are fused for visual display, the execution process of the physical entity equipment is displayed in a three-dimensional visual mode in real time, and related execution performance data is displayed dynamically. The information detected in the machining site is fed back to the detection model in real time and displayed in the simulation model of the dotting machine equipment, and an operator controls the simulation model of the dotting machine equipment according to the detection judgment result, so that the operations and control of the dotting machine equipment and the simulation model can be synchronously controlled in parallel.

The technical principles of the present invention have been described above in connection with specific embodiments. These descriptions are intended merely to explain the principles of the invention and are not to be construed in any way as limiting the scope of the invention. Based on the explanations herein, other embodiments of the present invention will be suggested to one skilled in the art without involving any inventive effort, and such embodiments are intended to fall within the scope of the present invention.

What is claimed is:
1. A parallel control method based on multi-period differential sampling and digital twinning technologies, which is applicable to a machining process of dotting machine equipment, comprising the following steps of:

a. detection: a1. clamping a machining raw material for making a mold onto dotting machine equipment, and configuring a photographing device according to photographing requirements; a2. starting the dotting machine equipment and the photographing device, and photographing, by the photographing device, the machining raw material in each of a plurality of machining periods to obtain a plurality of periodic samples; a3. integrating, by an integration processing module, the plurality of periodic samples into a sample image of one period by using a differential sampling technology over oscillation periods to establish a detection model; and a4. processing, by an image processing module, the sample image to obtain a detection image;

b. control model establishment: b1. carrying out simulation modeling for the dotting machine equipment by designing a simulation model of the dotting machine equipment to obtain a dotting machine model; b2, carrying out dynamic implementation of the dotting machine equipment by setting machining parameters for the dotting machine model according to a preset design, implementing actions of single machine equipment, implementing work-in-process logistics and motions, programming motion and action control scripts, and executing an off-line simulation run; b3, integrating the dotting machine model with the dotting machine equipment by using a virtual-real synchronization technology with a simulation platform to achieve motion synchronization of the dotting machine model and the dotting machine equipment; and b4, carrying out system integration design by building a virtual control network to implement an internet-of-things in a workshop, and building a virtual-real synchronized physical entity simulation platform by using a digital twinning technology to achieve motion synchronization of a single machine physical entity with a single machine digital model; and integrating an upper IVIES system with a digital twinning model such that the digital twinning model operates under instructions generated by the IVIES, and execution conditions of the digital twinning model are fed back to the IVIES, achieving online monitoring and simulation running of the dotting machine equipment; and c. parallel control: controlling the dotting machine model according to the detected image to perform parallel control on the dotting machine equipment;

in the step a, the integrating into the sample image of one period by the differential sampling technology over oscillation periods comprises the following specific steps of:

representing a machining period of same machining units in a machining path as T, and setting a sampling period of an industrial camera as $$nT + \frac{T}{m};$$

wherein n represents a responding speed of the industrial camera to the machining period, and m is a digit for evenly dividing one period of the machining unit according to precision requirements of digital twinning synchronization; and n is an integer obtained by rounding up a ratio of a camera time to the machining period;

m is set according to the precision requirements of digital twinning synchronization and used for dividing one machining period to determine that the state and machining quality of the machining equipment in one machining period is indirectly characterized by images of m time points, i.e. image data acquisition is carried out in a plurality of similar periods, in which an image is acquired at one time point in each period, such as an image is acquired at a first time point in a first period, an image is acquired at a second time point in a second period and so on, an image is acquired at an mth time point in a last period, and finally, m real-time states acquired in one machining process are combined according to a time sequence into a sampling state of one period;

in the step a4, the step of processing the sample image comprises: converting the sample image into a gray-scale image, and then processing the gray-scale image by noise reduction and contrast adjustment;

the method further comprises a judgment step b5 after the step b4, and the step b5 comprises: identifying and analyzing, by a detection identifying module, the detection image to obtain detection data, and comparing, by a judging device, the detection data with machining setting data;

when the detection data exceeds a threshold value set by the machining setting data, determining a judgment result as unqualified, and controlling, by an operator, the dotting machine model according to the judgment result to perform parallel control on the dotting machine equipment; and when the detection data does not exceed the threshold value set by the machining setting data, determining the judgment result as qualified, and stopping in-site detection operation without the operator controlling the dotting machine model for any operation.

2. The parallel control method based on multi-period differential sampling and digital twinning technologies of claim 1, wherein, in the step b1, the designing the simulation model of the dotting machine equipment comprises the following specific steps of: firstly, designing the simulation model with a mechanical three-dimensional modeling platform, then inputting an obtained design of the simulation model into a simulation platform for secondary processing of the model, modifying equipment size and layout in the simulation model, and distinguishing movable components and fixed components.

3. The parallel control method based on multi-period differential sampling and digital twinning technologies of claim 1, wherein, in the step b2, the executing the off-line simulation run comprises the following specific operations of: implementing process actions of the dotting machine with a scripting language by utilizing a secondary development function provided by the simulation platform, and performing punching tests with off-line simulation of machining parameters on the platform; and in the step b, the machining parameters set for the dotting machine model include: voltage, speed and pressure.

4. The parallel control method based on multi-period differential sampling and digital twinning technologies of claim 1, wherein, in the step b3, the virtual-real synchronization technology comprises: firstly, ensuring consistency of design parameters of the dotting machine model and the dotting machine equipment; taking the dotting machine model as a driving model, and taking the dotting machine equipment as a driven part; and connecting both the dotting machine model and the dotting machine equipment to a same PLC control system to achieve synchronization of signals of the dotting machine model and the dotting machine equipment;

in the step b3, the dotting machine model and the dotting machine equipment are both connected to the same PLC control system in a manner that: binding an I/O point in the simulation platform with an address of an I/O point in the PLC, and the I/O point in the PLC control system controls motion parameters of a physical entity; and the dotting machine model mainly works with a workpiece triggering a sensor and the I/O point and internal logic of the PLC control system driving the dotting machine equipment to perform motions synchronously.

5. The parallel control method based on multi-period differential sampling and digital twinning technologies of claim 4, wherein, the design parameters include: size, layout and control logic of the dotting machine model; the motion parameters include: moving direction, moving speed, stroke, starting and stopping of the dotting machine equipment; and the execution conditions of the digital twinning model include: work order completion information and random failures.

* * * * *